United States Patent
Amirijoo et al.

(10) Patent No.: US 9,866,355 B2
(45) Date of Patent: Jan. 9, 2018

(54) SERVICE AWARE INTERFERENCE MANAGEMENT

(75) Inventors: Mehdi Amirijoo, Linköping (SE); Fredrik Gunnarsson, Linköping (SE); Johan Moe, Mantorp (SE); Ke Wang Helmersson, Linköping (SE); Kristina Zetterberg, Linköping (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 484 days.

(21) Appl. No.: 14/350,618

(22) PCT Filed: Oct. 10, 2011

(86) PCT No.: PCT/SE2011/051211
§ 371 (c)(1),
(2), (4) Date: Apr. 9, 2014

(87) PCT Pub. No.: WO2013/055262
PCT Pub. Date: Apr. 18, 2013

(65) Prior Publication Data
US 2014/0248890 A1  Sep. 4, 2014

(51) Int. Cl.
*H04W 72/00* (2009.01)
*H04L 5/00* (2006.01)
(Continued)

(52) U.S. Cl.
CPC .......... *H04L 5/0037* (2013.01); *H04L 5/0064* (2013.01); *H04L 5/0073* (2013.01);
(Continued)

(58) Field of Classification Search
CPC ......... H04W 72/0426; H04W 72/0433; H04W 72/044; H04W 72/06; H04W 72/08; H04W 72/10; H04W 36/00
(Continued)

(56) References Cited

U.S. PATENT DOCUMENTS 8,208,937 B2   6/2012  Zhang et al.
8,599,770 B2  12/2013  Jang
(Continued)

FOREIGN PATENT DOCUMENTS

CN   101 494 481 A   7/2009
CN     102036397 A   4/2011
(Continued)

OTHER PUBLICATIONS

Supplementary European Search Report, European Application No. 11873900.2, Feb. 27, 2015, 8 pp.
(Continued)

*Primary Examiner* — Jean Gelin
(74) *Attorney, Agent, or Firm* — Myers Bigel, P.A.

(57) ABSTRACT

Methods, arrangement and network nodes for supporting inter-cell coordination of scheduling of radio resources subjected to inter cell interference. The methods involve identifying one or more radio resources which are subjected to inter-cell interference between a first cell and a second cell. The methods further involve deriving a respective service value related to service that could be provided in the respective first and second cell by use of the one or more radio resources. Further, transmissions in the one or more radio resources are controlled based on comparison of the service values, thus enabling inter-cell service value-based scheduling of the one or more radio resources, prioritizing services having the highest value per radio resource.

30 Claims, 17 Drawing Sheets

(51) Int. Cl.
*H04W 72/12* (2009.01)
*H04L 27/26* (2006.01)

(52) U.S. Cl.
CPC ..... *H04W 72/1226* (2013.01); *H04L 27/2602* (2013.01); *H04W 72/1247* (2013.01)

(58) Field of Classification Search
USPC ......... 455/448, 449, 450, 452.1, 452.2, 453, 455/63.1, 451
See application file for complete search history.

(56) References Cited

U.S. PATENT DOCUMENTS

| | | |
|---|---|---|
| 2002/0168983 A1 | 11/2002 | Kumaran et al. |
| 2003/0179756 A1 | 9/2003 | Cain |
| 2008/0009244 A1* | 1/2008 | Lee ................... H04W 72/1231 455/69 |
| 2009/0016223 A1 | 1/2009 | Kim et al. |
| 2009/0270109 A1* | 10/2009 | Wang Helmersson ........ H04W 52/367 455/453 |
| 2010/0317364 A1 | 12/2010 | Zhang et al. |
| 2011/0136494 A1 | 6/2011 | Kim et al. |
| 2012/0046030 A1* | 2/2012 | Siomina .................... G01S 5/00 455/423 |
| 2014/0119334 A1* | 5/2014 | Kazmi ................... H04W 24/10 370/330 |

FOREIGN PATENT DOCUMENTS

| | | |
|---|---|---|
| EP | 2 262 330 A1 | 12/2010 |
| WO | WO 2009/136825 A1 | 11/2009 |
| WO | WO 2009/116913 | 12/2010 |
| WO | WO 2010/145710 A1 | 12/2010 |
| WO | WO 2012/097741 A1 | 7/2012 |

OTHER PUBLICATIONS

Written Opinion of the International Searching Authority, PCT Application No. PCT/SE2011/051211, Jul. 2, 2012.
NGMN Alliance, "NGMN Use Cases related to Self Organising Network, Overall Description", May 31, 2007, 18 pp.
3GPP, Technical Report, "3rd Generation Partnership Project; Technical Specification Group Services and System Aspects; Telecommunication management; Study on management of Evolved Universal Terrestrial Radio Access Network (E-UTRAN) and Evolved Packet Core (EPC) (Release 8)", 3GPP TR 32.816 V8.0.0 (Dec. 2008), 38 pp.
3GPP, Technical Specification, "3rd Generation Partnership Project; Technical Specification Group Radio Access Network; Evolved Universal Terrestrial Radio Access Network (EUTRAN); X2 application protocol (X2AP) (Release 8)", 3GPP TS 36.423 V8.2.0 (Jun. 2008), 78 pp.
3GPP, Technical Specification, "3rd Generation Partnership Project; Technical Specification Group Radio Access Network; Evolved Universal Terrestrial Radio Access (E-UTRA); Physical layer procedures (Release 8)", 3GPP TS 36.213 V8.2.0 (Mar. 2008), 30 pp.
3GPP, Technical Specification, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 8)", 3GPP TS 36.300 V8.2.0 (Sep. 2007), 109 pp.
International Search Report, PCT Application No. PCT/SE2011/051211, Jul. 2, 2012.

* cited by examiner

| MOS/user value | Goodwill/operator value |
|---|---|
| 5 | 60 |
| 4 | 60 |
| 3 | 40 |
| 2 | -20 |
| 1 | -40 |

Figure 8b

| MOS/user value | Goodwill/operator value |
|---|---|
| 5 | 40 |
| 4 | 30 |
| 3 | 20 |
| 2 | 10 |
| 1 | 0 |

Figure 8c

SERVICE AWARE INTERFERENCE MANAGEMENT

CROSS REFERENCE TO RELATED APPLICATION

This application is a 35 U.S.C. §371 national stage application of PCT International Application No. PCT/SE2011/051211, filed on 10 Oct. 2011, the disclosure and content of which is incorporated by reference herein in its entirety. The above-referenced PCT International Application was published in the English language as International Publication No. WO 2013/055262 A1 on 18 Apr. 2013.

TECHNICAL FIELD

The invention relates to management of inter-cell interference in a cellular communication system.

BACKGROUND

The architecture of an LTE system is shown in FIG. 1. In LTE, the downlink is based on orthogonal frequency division multiplexing (OFDM) while the uplink is based on a single carrier modulation method known as discrete Fourier transform spread OFDM (DFT-S-OFDM)

Some Radio Access Technologies (RATs), e.g., E-UTRAN and UTRAN, support dynamic scheduling of uplink (UL) and/or downlink (DL) data, where radio resources are assigned to users and radio bearers according to the users momentary traffic demand, QoS requirements, and estimated channel quality. The eNB may assign radio resources in time or frequency to UEs experiencing, e.g., higher channel quality than other UEs which compete for the same radio resources.

An example of the radio resources in E-UTRAN are shown in FIG. 2. The smallest entity is a resource element 202. In E-UTRAN, the smallest schedulable entity is called a Scheduling Block (SB), consisting of two consecutive Resource Blocks (RBs), with a total length of 1 ms and width, 208, of 180 kHz, i.e. 12 sub-bands (or subcarriers) of 15 kHz each. An eNB in E-UTRAN allocates SBs to UEs both in time and frequency. In E-UTRAN, a UE may be configured to report Channel Quality Indicator (CQI) reports, indicating the quality of the DL. The scheduler may then assign SBs to the UE based on the CQI reports and QoS requirements.

In a so-called one reuse system, such as LTE, network nodes, e.g. eNBs, serving a respective cell allocate physical radio resource(s), such as a number of Physical Resource Blocks (PRBs) or sub bands, to the UEs in the served cell. When UEs in two neighboring cells are allocated or assigned radio resources which coincide in time and frequency, the transmissions in these radio resources may interfere with each other. Such interference is called a conflict or collision, and is illustrated in FIG. 3. A collision may result in a lower SINR, and one or more HARQ retransmissions may be needed to successfully decode the transmitted bits. Such retransmissions reduce the user throughput.

To alleviate the impact of such collisions and improve the system performance, Inter-Cell Interference Coordination (ICIC) techniques have been proposed. For example, 3GPP has specified a load indication procedure for ICIC, involving X2 signaling between the eNBs to exchange load information.

The load indication procedure for ICIC, specified by 3GPP, includes two load indicators:

The Interference Overload Indicator (IOI).
  The IOI indicates the interference level experienced by the indicating cell on all resource blocks. The IOI message indicates, per PRB, whether the PRB is subjected to high, medium or low interference.

The High Interference Indicator (HII).
  The HII indicates the occurrence of high interference sensitivity, as seen from a transmitting eNB. The message is a bit map indicating high or low interference sensitivity per PRB.

FIG. 4 shows an example scenario, where an IOI is transmitted from a cell A to a cell B over the X2 interface. The IOI indicates high interference for ⅓ of the PRBs (at the higher frequencies of the frequency bandwidth). The IOI further indicates low interference for the remaining ⅔ of the PRBs in question. Having received the IOI message, the receiving cell, cell B as shown in FIG. 4, may take the IOI information into account when scheduling radio resources, and select e.g. UEs located at the cell-center to be scheduled on PRBs indicated as subjected to high interference, in order to reduce interference to the indicating cell, i.e. cell A in this example.

FIG. 4 also shows a HII indicator being transmitted from cell A to cell B over the X2 interface. The HII indicates high interference sensitivity for ⅔ of the PRBs (at the lower frequencies of the frequency bandwidth) concerned by the HII. The HII further indicates low interference sensitivity for the remaining ⅓ of the PRBs in question. Having received a HII message, the receiving cell, cell B in this example, may take the HII information into account when scheduling radio resources, and e.g. avoid scheduling cell-edge UEs on the PRBs indicated as having a high interference sensitivity. The cell-edge UEs may be scheduled at the remaining ⅓ of the PRBs where interference sensitivity is low.

It could be questioned how a serving node in a cell (e.g. cell A in the example above) can know that it is users in a certain neighbor cell, e.g. cell B, that are causing interference to cell A. In the load indication procedure specified by 3GPP, it is assumed that the serving node has support from UE measurements, providing information about the vicinity. Further, a serving node in cell B can compare, e.g. the information in an IOI message from cell A, with what in fact was transmitted in cell B during the PRBs in question. This also implies the possibility that cell A may send IOI to more than one potentially interfering cell, e.g. when it is not obvious which the main interferer is.

SUMMARY

It would be desirable to improve inter-cell interference coordination and improve the utilization of radio resources subjected to inter-cell interference. It is an object of the invention to improve inter-cell interference coordination by supporting inter-cell coordination of scheduling of radio resources subjected to inter-cell interference in a cellular communication system.

According to a first aspect, a method is provided for supporting inter-cell coordination of scheduling of radio resources subjected to inter-cell interference in a cellular communication system. The method comprises identifying one or more radio resources, which are subjected to inter-cell interference between a first cell served by a first network node and a second cell served by a second network node. Further, a respective service value is derived, associated with the first and second network node is derived. The service values being related to service that could be provided in the respective first and second cell by use of the one or more radio resources. The method further comprises controlling transmissions in the one or more radio resources based on comparison of the service values.

According to a second aspect, an arrangement, G, is provided for supporting inter-cell coordination of scheduling of radio resources subjected to inter cell interference. The arrangement comprises a functional unit adapted to identify one or more radio resources subjected to inter-cell interference between a first cell served by a first network node and a second cell served by a second network node. The arrangement further comprises a service value deriving arrangement, which is adapted to derive a first service value associated with the first network node, related to service that could be provided in the first cell by use of the one or more radio resources. The service value deriving arrangement is further adapted to derive a second service value associated with the second network node, related to service that could be provided in the second cell by use of the one or more radio resources. The arrangement G further comprises a functional unit adapted a control unit, adapted to control transmissions in the one or more radio resources based on comparison of the service values.

According to a third aspect, a method is provided in a network node, A, in a cellular communication system, for supporting inter-cell coordination of scheduling of radio resources subjected to inter cell interference. The method comprises identifying one or more radio resources, subjected to interference from communication in a neighbor cell served by a neighbor network node, B, said interference exceeding a predefined threshold. Further, a first service value, related to service that could be provided in a cell served by the network node, A, by use of the identified one or more radio resources, is derived. Further, the identified radio resource(s) and the first service value are indicated to the neighbor network node B.

According to a fourth aspect, a network node, A, is provided in a cellular communication system, for supporting scheduling of radio resources subjected to inter cell interference. The network node, A, comprises a functional unit adapted to identify one or more radio resources, which are subjected to interference from communication in a cell served by a neighbor network node, B, said interference exceeding a predefined threshold. The network node, A, further comprises a functional unit adapted to derive a first service value related to the service that could be provided in a cell served by the network node, A, by use of the identified one or more radio resources. Further, the network node, A, comprises a functional unit adapted to indicate the identified radio resource(s) and the first service value to the neighbor network node, B.

According to a fifth aspect, a method is provided in a network node, B, in a cellular communication system, for supporting inter-cell coordination of scheduling of radio resources subjected to inter cell interference. The method comprises receiving an indication from a neighbor network node, A, of one or more radio resources, which resources are subjected to interference from a cell served by the network node, B. The method further comprises receiving an indication from the neighbor network node, A, of a potential first service value related to the one or more radio resources. Further, the method comprises deriving a second service value relating to service that could be provided in the cell served by the network node, B, by use of the one or more radio resources. The method further comprises controlling transmissions in the one or more radio resources based on comparison of the service values.

According to a sixth aspect, a network node, B, is provided in a cellular communication system, for supporting scheduling of radio resources subjected to inter cell interference. The network node, B, comprises a functional unit adapted to receive an indication from a neighbor network node, A, of one or more radio resources, which resources are subjected to interference from a cell served by network node B; and further adapted to receive an indication from the neighbor network node (A) of a potential first service value related to the one or more uplink radio resources. The network node, B, further comprises a functional unit adapted to derive a second service value related to service that could be provided in the cell served by the network node, B, by use of the one or more radio resources.

The network node, B, further comprises a functional unit adapted to control transmissions in the one or more radio resources based on comparison of the service values.

The above described methods and nodes may be used for enabling inter-cell service value-based scheduling of the one or more radio resources, prioritizing services having the highest value per radio resource. Applying the methods and nodes introduces a flexible way to maximize the user and/or operator value in terms of for example quality or goodwill. In embodiments where the radio environment and hence the spectral efficiency of each UE is considered, the value of scheduling a user is dynamically changing, which could also be taken into consideration in order to obtain the maximum value at every time. Service values of different neighboring cells may be taken into the consideration in the scheduling decisions. Thus, a better holistic prioritization of services in between cells may be achieved, in case of inter-cell interference.

The above method and network node may be implemented in different embodiments regarding e.g. how the service values are derived and how they may be indicated to another node. Further, the transmissions in a cell may be reduced in different ways in order to reduce interference to a neighbor cell.

The different features of the exemplary embodiments described herein may be combined in different ways according to need, requirements or preference.

BRIEF DESCRIPTION OF THE DRAWINGS

The invention will now be described in more detail by means of exemplifying embodiments and with reference to the accompanying drawings, in which:

FIGS. 8b and 8c show examples of mappings of user value to operator value.

DETAILED DESCRIPTION

Although many different scheduling methods are available today, the known solutions are inadequate in many aspects. While standardization has introduced a framework for service differentiation in the scheduling of different services, scheduling methods at hand are inflexible and do not support dynamical value oriented resource assignment, aiming at maximizing user and/or operator value at every time.

Figure 1:
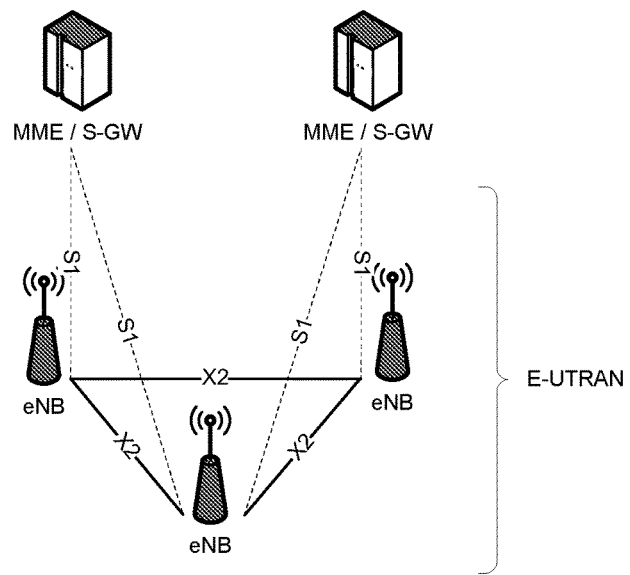
FIG. 1 is a schematic view of an LTE architecture showing logical interfaces between eNBs (X2) and between eNB and MME/S-GW (S1), according to the prior art.
Figure 2:
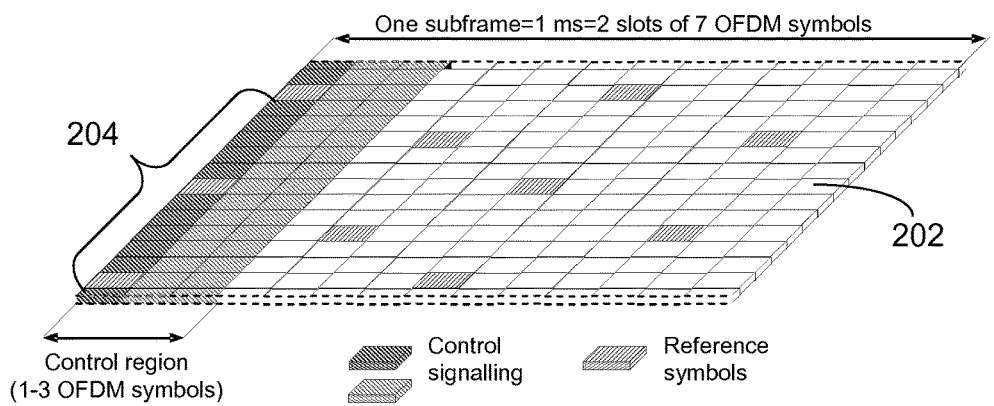
FIG. 2 shows a frequency portion of an E-UTRAN sub frame, illustrating radio resources in frequency and time, which are allocated by a scheduler in E-UTRAN, according to the prior art.
Figure 3:
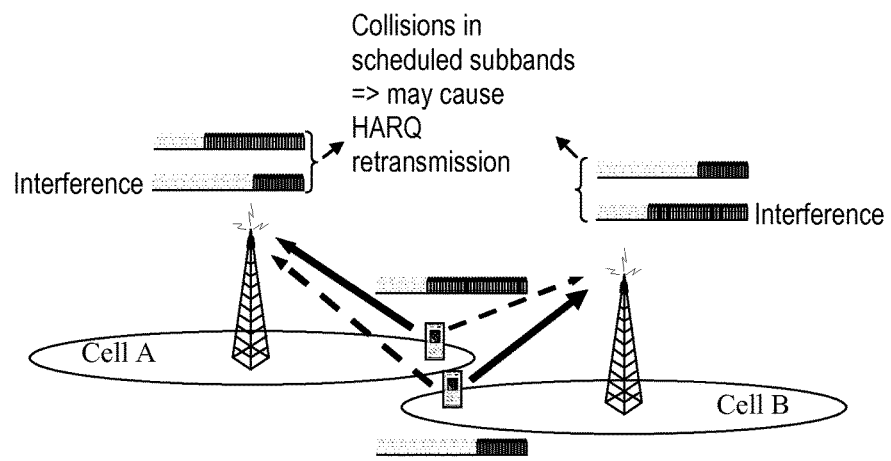
FIG. 3 shows an example of collision, or Inter Cell Interference, between two cells, in scheduled sub bands, according to the prior art.
Figure 4:
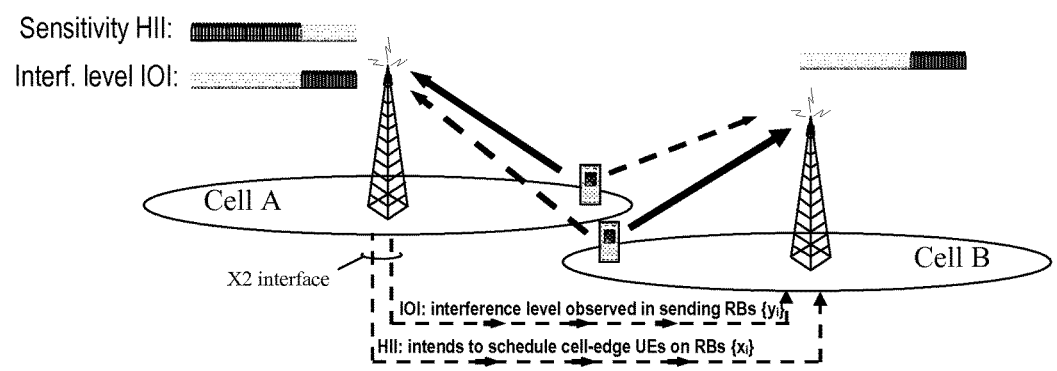
FIG. 4 shows an example of X2 load indication between cells, according to the prior art.
Figure 5:
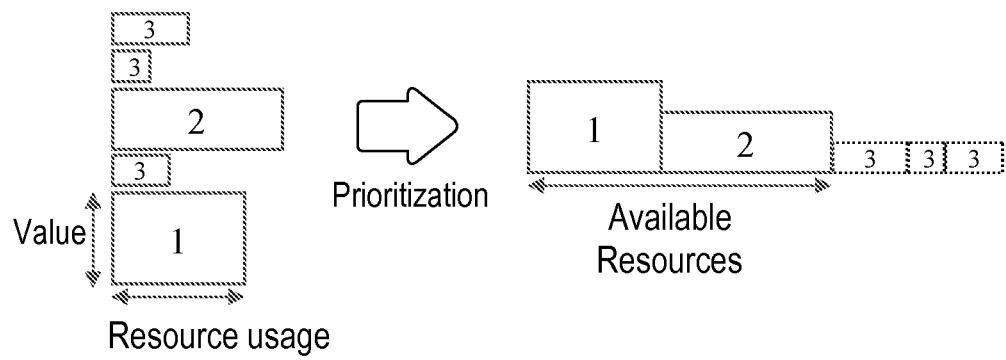
FIG. 5 illustrates conventional scheduling according to the prior art.
Figure 6:
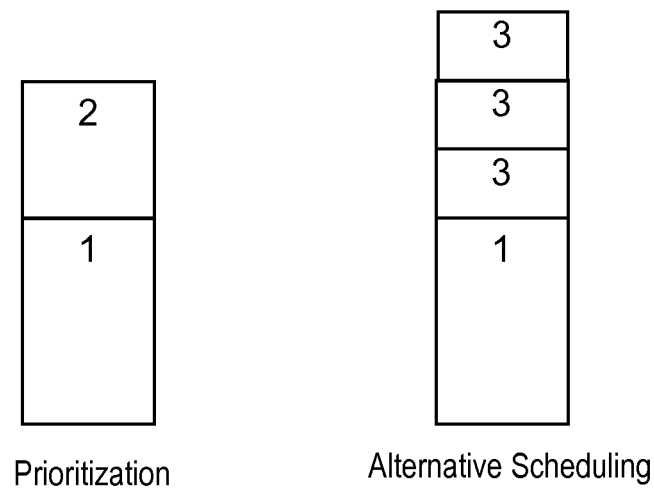
FIG. 6 illustrates the value which could be achieved when applying value oriented scheduling, as compared to the achieved value with conventional scheduling.

For example, consider three different services, service 1, 2 and 3, that all bring a different value (for example in terms of revenue) to the operator. Using priority based scheduling, these three services would probably be assigned priorities in the order of their value, meaning that the service with the highest value would be scheduled first. This is illustrated in FIG. 5, where five boxes correspond to five different users using one of the services 1, 2 or 3. The height of the boxes corresponds to the value obtained by scheduling the service, while the width of the boxes corresponds to the amount of resources needed to obtain the value. In the example in FIG. 5, it can be seen that the same value is obtained by all the users using service 3, but the amount of resources required to provide service 3 to the different users varies, which is a result of the different radio conditions of the users. In the example the network is fully loaded, meaning that all users cannot be scheduled. A conventional scheduler using a value based, static prioritization would schedule the users/UEs using service 1 and service 2 first, and leave out the three users/UEs using service 3, as illustrated in FIG. 5. However, the total achieved value would be higher if the three users using service 3 would have been scheduled instead of the user using service 2, as illustrated in FIG. 6. Thus, it would be more beneficial to use a scheduling method which is more value oriented than the conventional method. It should be noted, that in FIG. 6, the width of the boxes does not represent the amount of resources needed to obtain the value.

Figure 7:
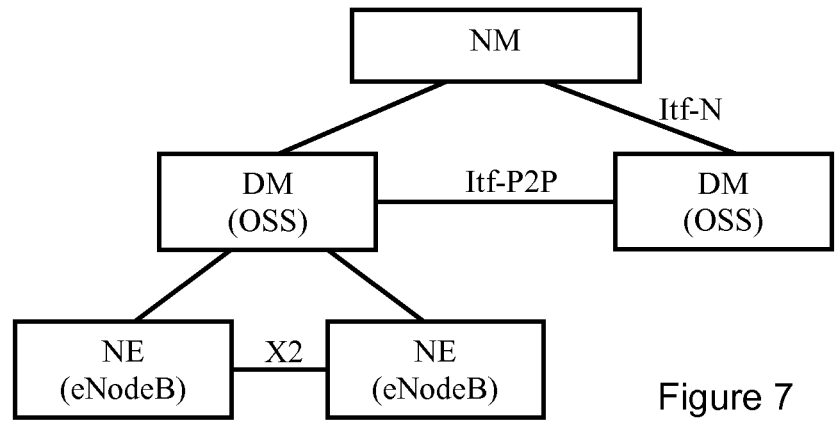
FIG. 7 illustrates an example of a management system.

The LTE-related examples in this description assumes a communication network management system e.g. as the one shown in FIG. 7. The node elements (NE), also referred to as eNodeB or eNB, are managed by a Domain Manager (DM), also referred to as the Operation and Support System (OSS). A DM may further be managed by a Network Manager (NM). Two NEs are interfaced by X2, whereas the interface between two DMs is referred to as Itf-P2P.

In this description, it is further assumed that any function that automatically optimizes NE parameters can in principle execute in the NE, DM, or the NM.

The solution described herein is applicable to all 3GPP technologies or any other multi cellular network. This means that the suggested procedure or algorithm may execute e.g. in RNC in a WCDMA type system or in eNodeB in a LTE type system.

Currently it is not possible for a node serving a first cell to know how valuable it would be for the end user, nor for the operator, to support a second node serving a second cell to keep an acceptable SINR for its users. If the node serving the first cell is only aware of its own needs, i.e. being "selfish", it would only promote its own users, although, with the specified 3GPP solution described above, the node serving the first cell would know, e.g. by IOI, that the second cell is seeing a high interference. However, the node serving the first cell would be unable to judge whether it should back off and support the SINR in the second cell, and even if so, said node would not be able to determine how much it should back off. This is identified as a problem.

In order to be able to support improved SINR in a neighbor cell, the node serving the first cell would need more information. The node serving the first cell would need to be informed of the value attached or associated with supporting a neighbor cell and users/UEs therein, which are subjected to interference from the first cell. When having knowledge of such value(s), these values could be compared to the value of supporting the users in the own (first) cell, and the services associated with these users. Such a value, which relates to a user/operator perceived value, will be described in more detail below for a better understanding. Such a value is currently not defined or exchanged between cells e.g. in LTE. Within this description, such a value will be referred to as a service value.

Deriving of a Service Value

A service value represents information on user and/or operator value of a service at a certain performance or quality of said service. Service value curves may be used in order to create scheduling weight curves. Such scheduling weight curves will however not be described herein. Service values for a certain service may be derived e.g. by performing some or all of the steps below:

Step A: Mapping performance to user value
Step B: Mapping performance to operator value
Step C: Calculating concave value curve
Step D: Scaling curve with spectral efficiency The steps are described in more detail in the following.

Step A—Mapping Performance to User Value

Figure 8A:
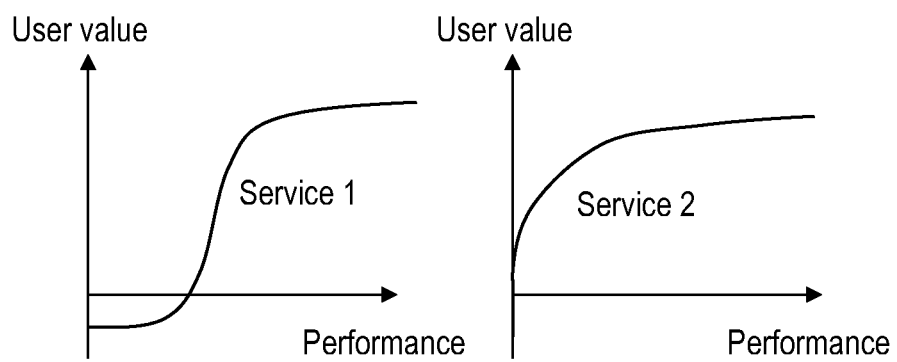
FIG. 8*a* shows an example of performance to user value mapping for two different services.

In step A the performance of a service is mapped to the user value in terms of, e.g., quality or Mean Opinion Score (MOS). The performance can be expressed as a performance function, depending on e.g. throughput and/or delay margin. The performance function may look different for different services and users, but should be normalized in a way to make them comparable. For example, for a delay sensitive service, such as video telephony, the performance would depend mainly on the delay margin, while for a service where throughput is more important, the performance function would depend mainly on throughput. Different relations may be defined for different service and user subscription combinations. An example of the user value definition is shown in FIG. 8a.

The performance to user value mapping could for example be done by the operator or by the service provider. Default mappings for the most common services could be preconfigured by the vendor in the radio access network or the operation and support system (OSS).

Step B—Mapping Performance to Operator Value

In step B, the performance, as described above, of a service is mapped to an operator value, in terms of e.g. overall quality, total user satisfaction, goodwill or even money. This could for example be done by translating the user value into operator value and using the performance to user value mapping obtained in step A. For example, if a mapping of throughput to MOS is available, this could be translated to a mapping of throughput to operator value by defining the operator value for each MOS. This value would typically depend on service, subscription type and the business model of the operator and is hence best suited to be defined by the operator. Two different examples of the mapping of user value to operator value are shown in FIGS. 8b and 8c. For example, the operator may define, e.g. as in FIG. 8b, that low qualities levels should be avoided, a MOS value at 4 is enough in case of resource limitations (the user would get 5 only when free resources are available). In FIG. 8c, the mapping indicates "the higher the quality the better".

The operator value shall not be mixed up with a service subscription, i.e. what the end user finally pays. There is however a relation; if the operator sells services or service subscriptions, independently of whether it is provided by the operator (smart pipe) or a third party (over the top), the operator value could reflect what the end user pays. Selling a gold subscription would most certainly map to overall high values/high penalties for included services.

Step C—Calculating Concave Value Curve

Figure 8D:
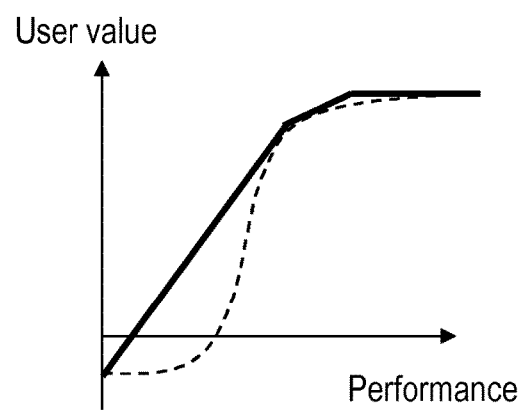
FIG. 8d shows an example of an approximation of a value curve to a concave function.

In step C, the performance to value curve (derived in step A and/or B) is approximated with a concave function, in order to obtain a value curve, which have a continuously decreasing derivative, i.e. a concave value curve. An example is shown in FIG. 8d. This is done as a preparation for deriving information to be used for scheduling.

Step D—Scaling Curve with Spectral Efficiency

Figure 8E:
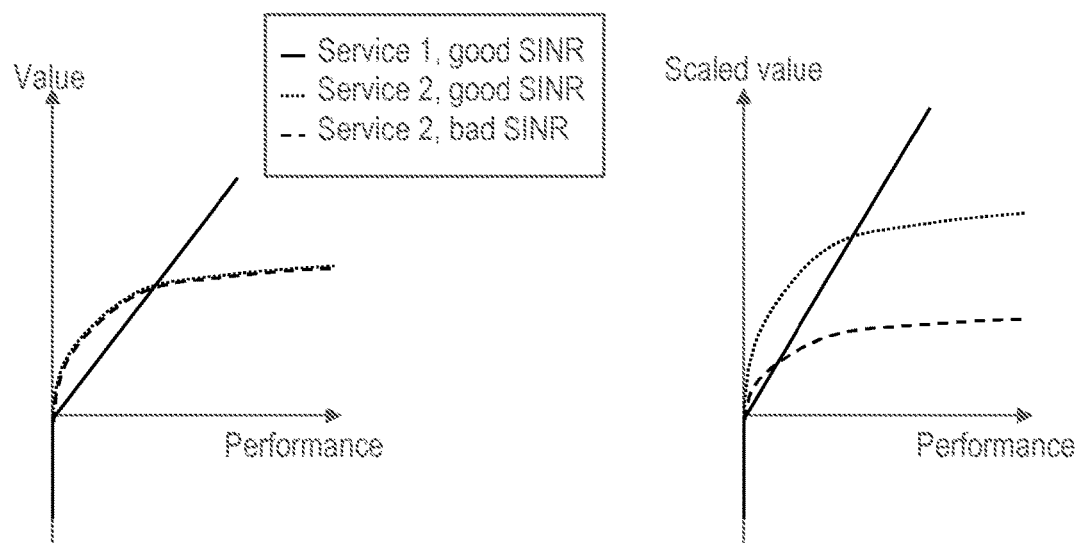
FIG. 8e shows an example of scaling of value curves depending on radio conditions.

In step D, the value curve (derived in step A, B or C), is scaled with the spectral efficiency, or the number of bits that can be transmitted per resource block, for each user. This can be based on for example the Signal to Interference and Noise Ratio (SINR) of the user. The scaling will result in that a UE that can transmit a certain number of bits using only a few resources relatively will be valued higher for a given service than a UE with worse radio conditions that need more resources to transfer the same amount of bits. An example is shown in FIG. 8e, where the dashed and the dotted curves represent two users/UEs using the same service, service 2 in FIG. 8e, with the same value curve. The dotted line user, however, has a higher SINR than the dashed line user, wherefore the scaled value of the dotted line user will be higher than the scaled value of the dashed line user.

From the service value curve, the value increase per performance increase may be obtained, where performance can be a function of e.g. throughput and/or delay margin. The performance can be expressed as a performance function, depending on for example throughput and/or delay margin, as previously described.

Taking service value into account will enable a scheduler to, in every time instant, schedule the user that will increase the (relative) user or operator value the most, given the current performance. Further, a scheduler will be enabled to, in every time instant, schedule the user that will increase the (relative) user or operator value the most, also considering the performance increase achievable at the given scheduling time instant.

Service-Centric ICIC

The solution described herein relates to improving ICIC by the sharing of information indicating a service value, in addition to already standardized interference information shared between cells, such as IOI and HII. With such value-related information, a more holistic approach may be taken in a cellular communication system, such that services with a high value can be promoted, irrespective of in which cell the services are provided. The solution described herein further relates to maximizing the user and/or operator value, also between cells, in terms of, for example, quality or goodwill, by using information on how, or to what extent, a user and/or operator values (appreciates) the performance of a certain service, as input to scheduling decisions.

In so-called one-reuse-systems, mobile terminals (UEs) in one cell and base stations (BSs) in other cells interfere with each other mainly when the UEs are located close to a border between the cells. The problem with interference becomes more evident in situations where the cell load is high, since at high load, most resources are needed to fulfill the service requests, and thus the risk for ICI, e.g. collision, is high.

In an exemplifying embodiment, the following steps are taken in order to accomplish ICIC where service value is taken into account, which may be referred to as service-centric ICIC:

1. Identify high interference in cell A and transmit UL IOI message to (node serving) interfering neighbor cell, cell B, together with service value indication.
2. Determine, in cell B, whether communication with (to and/or from) UEs camping on cell B shall be limited, e.g. if the UEs should be limited in their UL transmission.
3. Select, in cell B, a set of UEs to be subjected to limitations, e.g. in UL transmissions.
4. Limit, in cell B, communication with (to and/or from) UEs from the selected set of UEs.

Steps 3 and 4 are relevant at least when the step 2 results in that communication with UEs in cell B should be limited. Each of these steps is further elaborated below.

Step 1

When one or more UEs in a cell A experience high interference, e.g. in the UL, a serving node in cell A would then, according to 3GPP, signal a "UL Interference Overload Indication" and/or "UL High Interference Indication", e.g. in a so-called LOAD INFORMATION message. These terms are typically used in LTE type systems. In other types of systems, e.g. WCDMA, load information may be different in format, content and/or terminology. Assuming that the interference to cell A is caused by one or more UEs in cell B, the UL Interference Overload Indication will be transmitted from a serving node in cell A to a serving node in cell B. The message could also be transmitted to further neighbor cells, as previously described.

In addition to the IOI message, the node serving cell A also includes a service value indication, indicating or describing the service value potential to the interfering cells, in accordance with an embodiment of the solution described herein. The service value could relate to a service that is currently provided in the resources in question, and/or to a service that is about to be provided. By including a service value indication, it could be determined or judged in cell B, based on the indicated service value, whether the communication in cell B should be limited, in favor of cell A, in the radio resources indicated in the message.

There may be collocated UEs in the interfered cell, e.g. close to the cell border. Therefore, such a situation should be handled in some way when determining the service value potential to be indicated to one or more interfering cells. A service value indication representing more than one UE could be configured in different ways. Such a service value indication representing more than one UE could e.g. be formed by one or more of:

taking the average over all services provided (in cell A) to the UEs in question.

taking a certain percentile over all service provided (in cell A) to the UEs in question deriving an indicator expressing a summary of service values in cell A a service value indication for every PRB (all PRBs concerned by the IOI or HII message)

a service value indication for each PRB that is indicated as subjected to high-interference in the IOI.

Figure 10:
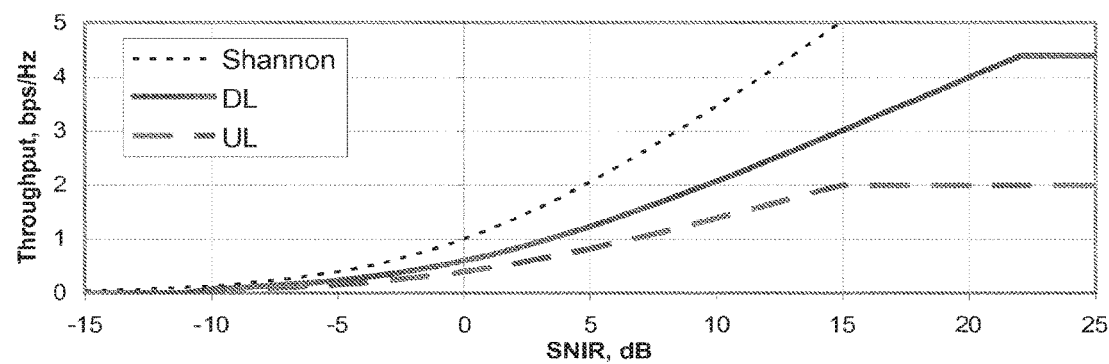
FIG. 10 illustrates a relationship between SNIR and throughput.

The service value potential should be derived or calculated. One component which could be used when deriving the service value potential is an estimate of the interference floor (noise floor) for the respective neighbors. Such an estimate of the interference floor may be derived on more long term basis, e.g. having the base station in a cell collecting information on the interference floor over a period of time. For example, interference from a neighbor cell B could be measured continuously, in order to find the lowest possible interference level, which could be selected to define the interference floor in certain locations or areas in the cell. Then, the difference between a measure of the current interference and the interference floor could be used to define the SNIR difference between the current situation and a prospective situation with lower interference. The estimated SNIR difference could be used for deriving a good estimate of a possible improvement in for example throughput, or some other quality-related measure, for one or more UEs in a cell. FIG. 10 illustrates a way of deriving a prospective increase in throughput from an estimated increase in SINR. The throughput increase potential could then be used to derive the service value potential. The service value potential could be expressed or conveyed e.g. as a potential increase in service value if/when interference is lowered to the interference floor, possibly in combination with a current service value. The service value potential could further be expressed e.g. as a potential absolute service value.

Another way of conveying the service value information is to convey a quality of service class indicator (QCI) in the service value indication together with information about the current service value. Assuming that all serving nodes/eNBs are aware of service value models for each QCI, then an eNB receiving a service value indication can look up the service value model from the service value indication. The base stations can be informed about the service value models via OaM.

Step 2

When a node serving a first interfering cell (e.g. cell B) receives an "UL Interference Overload Indication" and a service value potential related to radio resources in a neighbor second interfered cell (e.g. cell A), it will compare the received service value potential with the service value provided in the concerned radio resources in the first interfering cell. This may be performed e.g. as determining how much service value that would be lost in the first interfering cell if the transmissions in concerned radio resources in the first interfering cell would be adjusted, such that the interference to the second cell would be reduced or eliminated. Such a service value loss could e.g. be determined when the received service value indication is expressed as a potential service value increase or gain. In order to determine how much value that would be lost, the users/UEs causing the interference should be identified. These UEs could be identified using signal strength measurements, e.g., RSRP. For example, if a UE in the first interfering cell reports the second cell as the cell from which the second highest signal strength is received, then this UE is a candidate for UL transmission limitation.

If it is determined, in the node serving the first interfering cell, that the service value loss in the first interfering cell is lower than the service value potential indicated by the second cell, then the node serving the first interfering cell will actively lower its service value in the concerned radio resources, by limiting e.g. the UL transmission of one or more UEs in the first cell. As such, the UEs in the first cell are down prioritized to give precedence to the services (of a higher value) in a neighbor cell.

Step 3

Figure 11:
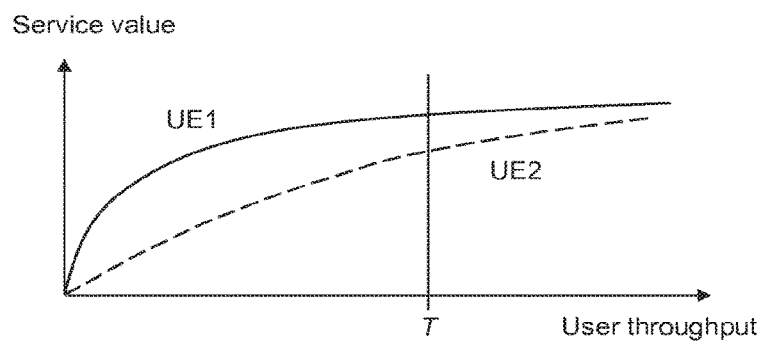
FIG. 11 illustrates service value curves for two UEs.

The set of UEs which are to be limited e.g. in their UL transmissions, needs to be considered. It is desirable to minimize the service value degradation in the first cell when limiting communication in the first cell in favor of the second cell. In order to minimize the degradation, service value curves of UEs in the first cell can be considered. For example, assuming that two UEs have been identified in the first cell, which UEs cause interference (in the concerned radio resources) to the second cell. In order to minimize the service value degradation or loss in a cell when limiting UE communication, the UEs which have a low derivative of their associated service value curves at the current quality level should be limited. FIG. 11 illustrates exemplifying service value curves of two UEs, UE1 and UE2. In the example in FIG. 11, it would be more beneficial to limit or degrade UE1 than UE2, as the derivative (or service value change per throughput unit), at the current user throughput T is lower for UE1 than for UE 2. That is, an equally large quality reduction in terms of throughput, for the two UEs, would result in a smaller service value loss for UE1 than for UE2.

Step 4

There are several ways of limiting the transmissions to or from a UE in a cell, for example:

Reducing the transmission bandwidth or ratio of total resources, in terms of frequency and time, allocated to the UE Reducing the transmission power of the UE, by adjusting the UL power control parameters For both cases, the reduction in transmission power in the first interfering cell (cell B in the example above) could be estimated. If assuming that signal strength measurements (geometry estimations) from the second cell (cell A in the example above) are available, the interference (or change thereof) generated towards the second cell could be calculated. Having calculated the reduction in interference, the increase in service value in the second cell can be estimated.

Another solution would be to gradually limit e.g. the UL transmission, e.g. in one or more of the ways exemplified above, of one or more selected UEs in the first interfering cell, and to observe the outcome in the second cell.

Another possibility is that each signaled resource, e.g. each PRB, is connected with a service value. For example, different services could be placed at different locations/resources, e.g. in different PRBs, depending on service value. This would give the interfering cell a possibility to make partial precedence to an interfered neighbor cell. For example, as illustrated in FIG. 12a, in some PRBs 1202, the interfering cell B could have a service with higher value than the potential value in the interfered cell A, and could therefore refrain from limiting the interference in those PRBs 1202.

Figure 12A:
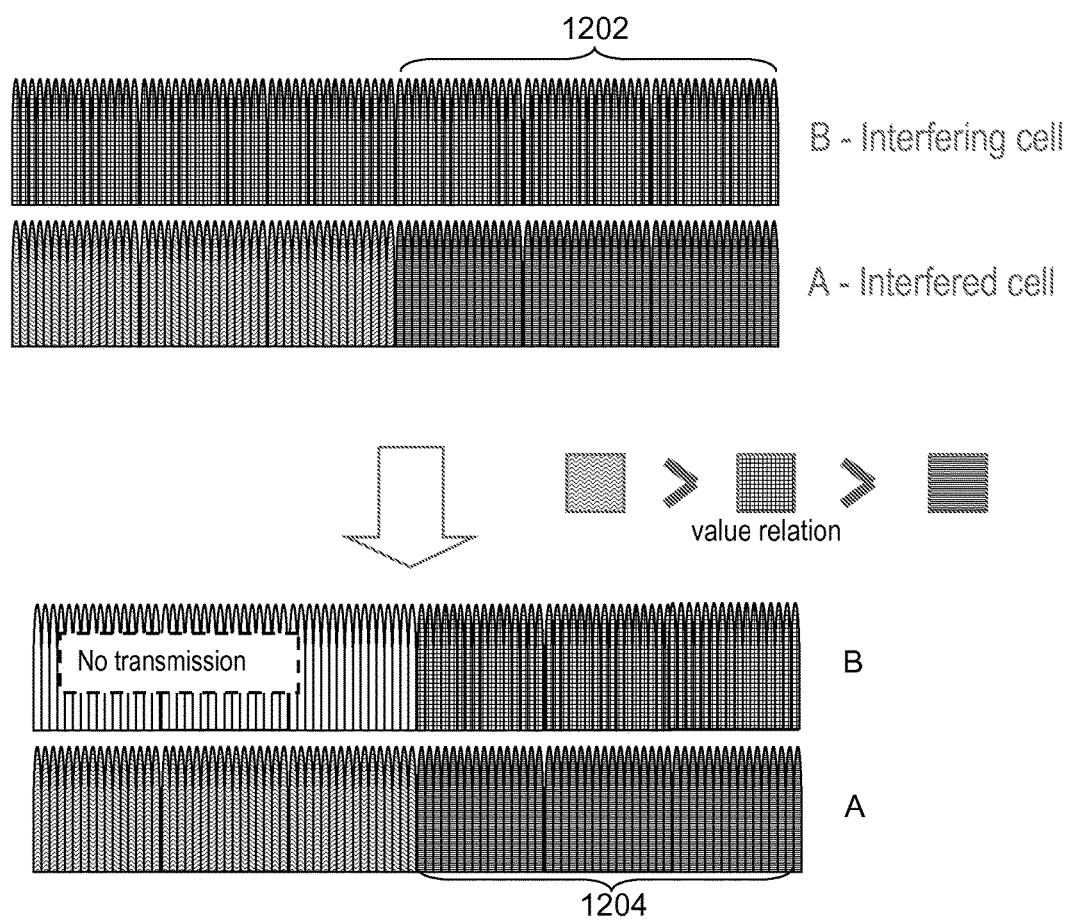
FIG. 12a illustrates an exemplifying result of applying an exemplifying embodiment for ICIC between a cell A and a cell B. Cell B is interfering cell A, and cell A sends information to B so that B decides to stop interfering on a specific band.

In FIG. 12a, if cell B would also perceive A as an interferer, B would send similar information and A would stop low value service in resources 1204. Once the situation is resolved, cells would need to interact—but that is left outside the scope of this disclosure.

Figure 12B:
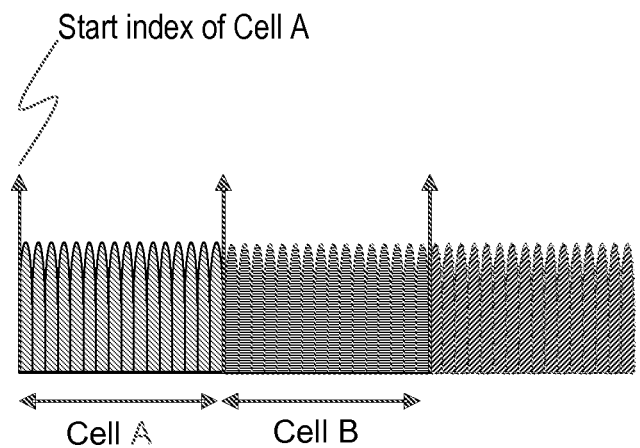
FIG. 12b illustrates the use of start indices for different cells over a frequency spectrum.

In another embodiment, services generating high service value are protected from ICI through a so-called soft reuse scheme, where several start indices are used to schedule the UEs. The distribution of such start indices over the frequency spectrum is illustrated in FIG. 12b. For example, it may be desired to protect UEs, which are located at the cell edge and having a high derivative in their respective service value curves. If such UEs are not protected from ICI, it may potentially result in unnecessarily low service values for the UEs.

One way to protect such UEs is to identify the UEs in each cell, which are:
- at the cell edge (and sensitive to interference), and
- sensitive to throughput and delay variations, i.e., having a high derivative on the service value curve.

The identified UEs are then scheduled or placed as close as possible to the start index of the respective cell. This will ensure that UEs which are sensitive in the sense described above are scheduled in certain different sub bands in different cells, which sub bands may be protected. For example, it could then be arranged such that resources in sub bands in one cell, which are close to a start index in a neighbor cell, could be allocated to non-cell-edge UEs.

A number of variants to service value information sharing and algorithm deployment are possible in a distributed solution. It should be evident for a person skilled in the art that calculations can be done in the other cell/eNodeB/RNC depending on the architecture. This would have impact on the information shared and the interfaces over which the information is shared.

Below, exemplifying embodiments of procedures, arrangements and nodes will be described, with reference to FIGS. 13-20.

Figure 13:
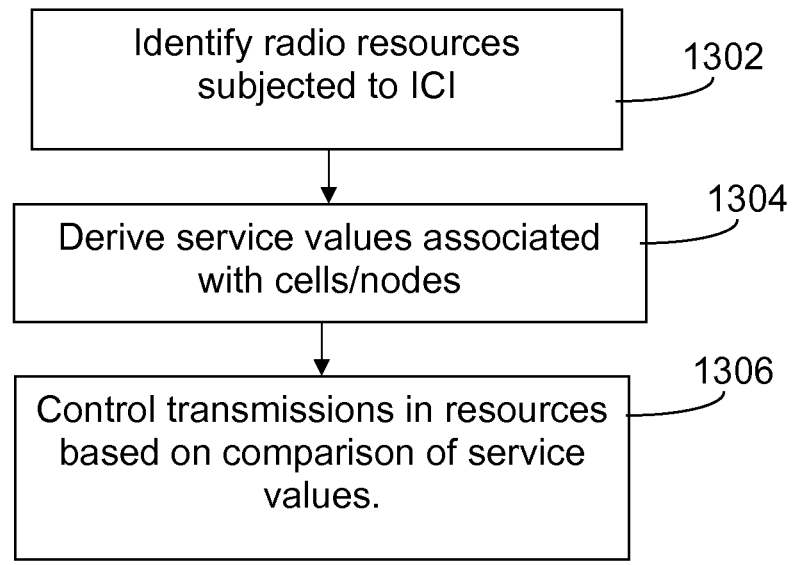
FIG. 13 is a flow diagram illustrating a procedure in an arrangement according to an exemplifying embodiment.

Exemplifying Procedure in Arrangement, FIG. 13

An exemplifying embodiment of the procedure for supporting inter cell coordination of scheduling of radio resources subjected to inter-cell interference in a cellular communication system will be described below with reference to FIG. 13. The procedure is to be performed by an arrangement in the cellular communication system. Since the generalized procedure may be performed in different types of cellular communication systems, such as e.g. WCDMA, LTE or LTE-A, the different actions of the procedure may be performed in one or more different nodes, e.g. depending on characteristics inherent in the cellular communication system type. For example, in a WCDMA type system, the inter-cell interference may be experienced between two or more nodes associated with the same RNC, or, between two or more nodes associated with different RNCs. Thus, the procedure may be performed e.g. in one RNC, or distributed over two or more RNCs, possibly in combination with one or more base stations. In an LTE type system, the procedure may be performed in one or more eNBs, or in one or more control nodes.

FIG. 13 illustrates a generalized embodiment. One or more radio resources subjected to inter-cell interference between a first cell and a second cell are identified in an action 1302. The first cell is assumed to be served by a first network node, such as e.g. a base station/eNB, and the second cell is assumed to be served by a second network node, such as e.g. a base station/eNB. Further, a respective service value associated with the first and second network node is derived in an action 1304. The respective service value is related to service that could be provided in the respective first and second cell by use of the one or more radio resources.

Further, the transmissions related to at least one of the cells are controlled based on comparison of the service values, in an action 1306. For example, it may be determined how the one or more radio resources should be allocated to, e.g. shared or divided between, the first and second network node/cell (and other further nodes/cells, if relevant), based on comparison of the service values. The transmissions in the respective cells could then be controlled (e.g. as previously described) based e.g. on the determined allocation. Further, the control of the transmissions may be an iterative process involving feedback on the result of changes e.g. in transmission power. Thus, inter-cell service value-based scheduling of the one or more radio resources is enabled, where services having the highest value per radio resource are prioritized.

The service values may be derived in different ways, which is described e.g. further below. The deriving of the respective service value may be performed in the same or in different network nodes depending on e.g. network topology and/or preference. When the service values are derived in different nodes or entities, one or both values should be indicated or signaled to another node or entity, such that both values are available to a node or entity, which is to control the transmissions in one or more of the cells involved based on comparison of the service values.

The procedure above has been exemplified for two cells e.g. for reasons of clarity. However, the procedure is applicable for more than two cells, and the description above is considered to cover the case with more than two cells. When more than two cells are involved in the inter-cell interference, service values related to these cells are derived in a similar way, and control of transmissions in the radio resources is based also on said service values. Thus, the providable services associated with the highest value per radio resource among the different cells could be prioritized.

Figure 15:
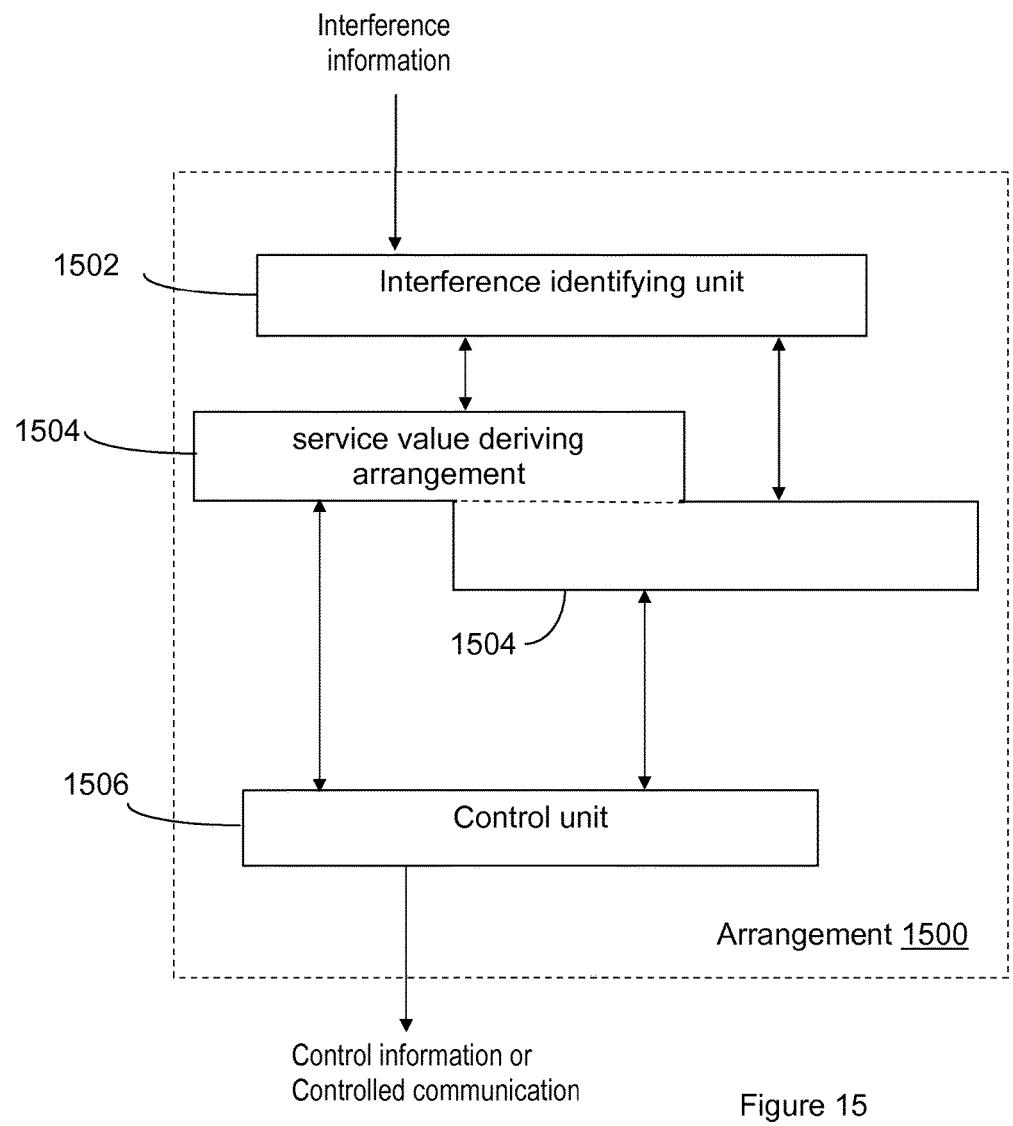

Exemplifying Arrangement, FIG. 15

Below, an example arrangement 1500, adapted to enable the performance of the above described procedure for supporting inter-cell coordination of scheduling of radio resources subjected to inter-cell interference in a cellular communication system will be described with reference to FIG. 15.

The arrangement 1500 comprises an interference identifying unit 1502, which is adapted to identify one or more radio resources subjected to inter-cell interference between a first cell served by a first network node and a second cell served by a second network node. Further, the arrangement 1500 comprises a service value deriving arrangement 1504, adapted to derive a first service value associated with the first network node, related to the service that could be provided in the first cell by use of the one or more radio resources. Further, the service value deriving arrangement 1504 is adapted to derive a second service value associated with the second network node, related to the service that could be provided in the second cell by use of the one or more radio resources.

When the deriving of the respective service values is to be performed in different nodes, the service value arrangement may comprise units or entities in the respective nodes, i.e. be distributed over the nodes. However, when the deriving of the respective service values is to be performed in the same node, the service value deriving arrangement 1504 may be one unit or entity. The arrangement 1501 further comprises a control unit 1506, which is adapted to control transmissions in the one or more radio resources based on comparison of the service values. Thus, inter-cell service value-based scheduling of the one or more radio resources is enabled, as described above.

Figure 14:
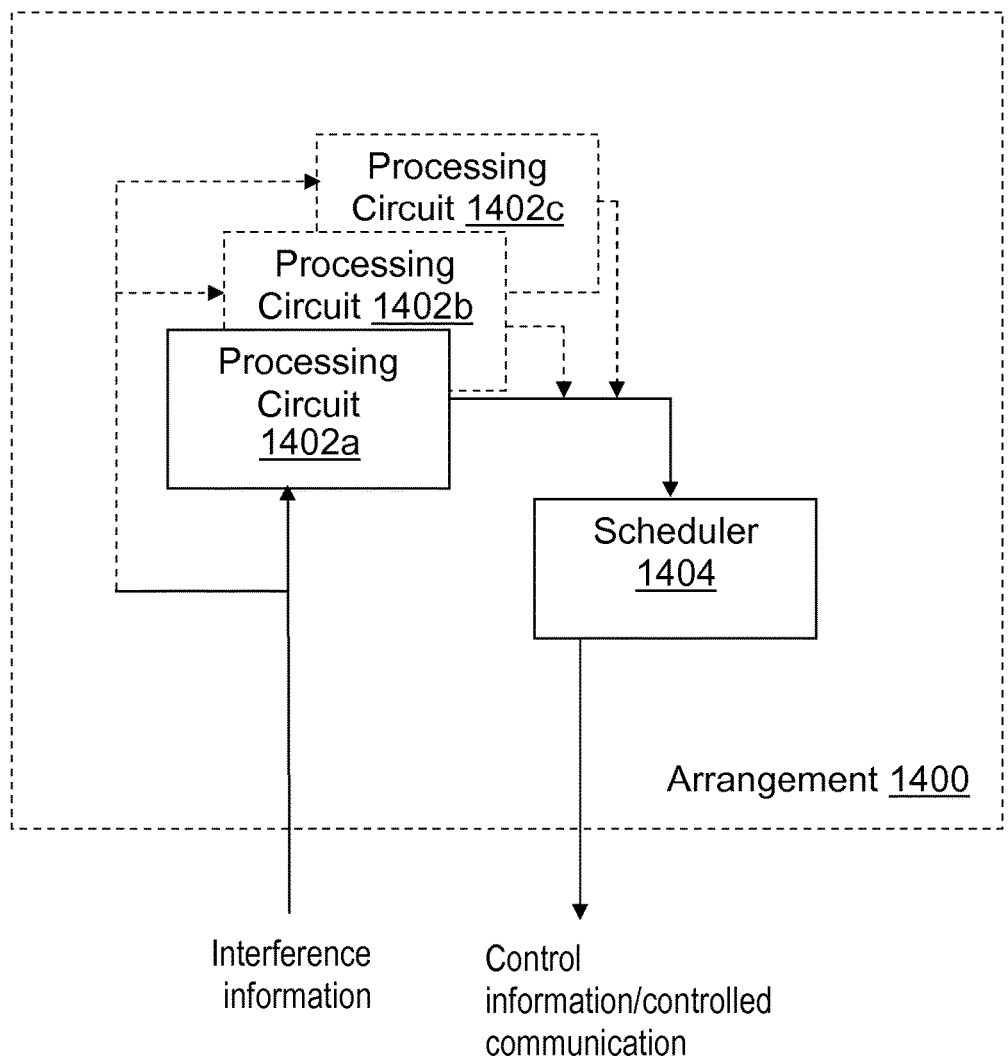
FIGS. 14 and 15 are block diagrams illustrating arrangements according to different exemplifying embodiments.

The arrangement 1500 could be implemented e.g. by one or more of: a processor or a micro processor and adequate software stored in a memory, a Programmable Logic Device (PLD) or other electronic component(s) or processing circuit(s) configured to perform the actions mentioned above. FIG. 14 illustrates an implementation using one or more processing circuits 1402, also comprising memory, and a scheduler 1404. In analogy with the reasoning concerning the service value deriving arrangement above, the processing circuits 1402*a, b, c*, etc. could be located in different nodes in the cellular communication system.

Figure 16:
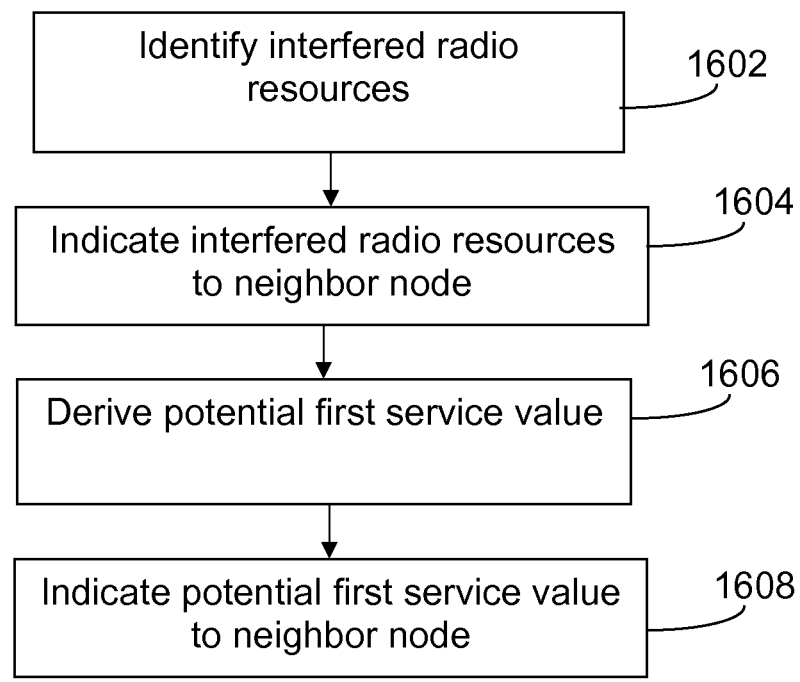
FIG. 16 is a flow diagram illustrating a procedure in a network node A (or an indicating or interfered network node) according to an exemplifying embodiment.

Exemplifying Procedure in a Network Node a Serving an Interfered Cell, FIG. 16

An exemplifying embodiment of the procedure for supporting inter-cell coordination of scheduling of radio resources subjected to inter-cell interference in a cellular communication system will be described below with reference to FIG. 16. The procedure is to be performed in a network node A in the cellular communication system. The network node A may also be denoted the "indicating network node", or "the interfered network node". The network node A may be an eNB in an LTE type cellular communication system, or e.g. a base station or an RNC in a WCDMA type system. The letters "A" and "B" are used below for reasons of identification only.

The procedure comprises identifying one or more radio resources in an action 1602, which radio resources are subjected to inter-cell interference, exceeding a predefined threshold, from communication in a neighbor cell served by a neighbor network node B. The principle of a predetermined threshold may be used to identify the radio resources in which the ICI can be a problem, i.e. where the ICI is substantial. Further, the identified radio resource(s) is/are indicated or identified to the neighbor node B in an action 1604. A first service value is derived in an action 1606. The first service value is related to service that could be provided in a cell served by the network node A by use of the identified one or more radio resources. The derived first service value is indicated to the neighbor network node B in an action 1608. Thereby, inter-cell service value-based scheduling of the one or more radio resources is enabled as described above.

The deriving of the first service value could involve determining a current interference level in the one or more radio resources. The current interference level would typically be measured by one or more UEs located relatively close to the cell edge, i.e. the border between the cells. Information on the current interference level could thus be received from said UEs, or e.g. be derived from communication with the UEs. Further, a lowest interference level could be (have been) determined at the same location(s) or approximately the same location. For example, the interference level in an area could be monitored over a period of time, and the lowest interference level during the time of monitoring could be appointed as a lowest interference level.

Further, the deriving of the first service value could involve comparing the current interference level to the lowest interference level measured over a period of time. An increase of a performance related characteristic, such as e.g. capacity or coverage, of the one or more radio resources could be determined based on a current interference level and a lowest interference level, i.e. the prospective change if the interference level changed from the current level to the lowest level. Further, a service value increase could be derived based on the on a current interference level and a lowest interference level. Further, a service value increase could be derived as a function of the performance related characteristic of the one or more radio resources. A service value increase could also be derived e.g. from a current service value of a currently provided service and a potential service value of a service which is about to be provided.

The first service value could be indicated to the neighbor network node e.g. by a service value increase and/or an explicit service value. Further, the first service value could be indicated e.g. by an indicator of a service type; a potential increase of a performance related characteristic, and an indicator of a service type; a current service value and an indicator of a relation between a potential service value and the current service value, and/or a quality of service indicator and a current service value. The current service value could be related to the service, which is currently provided, and the potential service value could be related to the same service or to service which is about to be provided. The first service value, in any of the forms described above, may be indicated per uplink radio resource, for all of the uplink radio resources, or for a subset thereof. The indications of the identified radio resource(s) and the first service value to the neighbor network node may be conveyed jointly, e.g. in the same message, or separately, e.g. in different messages or communications.

When two or more UEs are collocated, e.g. at the cell edge, it may be desired to derive and indicate a first service value that should represent more than one UE. Such a service value could be derived by averaging service values of service provided to the UEs in question. Further, a predefined percentile over the service values of the service provided to the UEs in question may be used; and/or, a summary or average of service values in the cell served by the network node A. A first service value may be derived and indicated e.g. per radio resource, according to any of the examples above.

Figure 18:
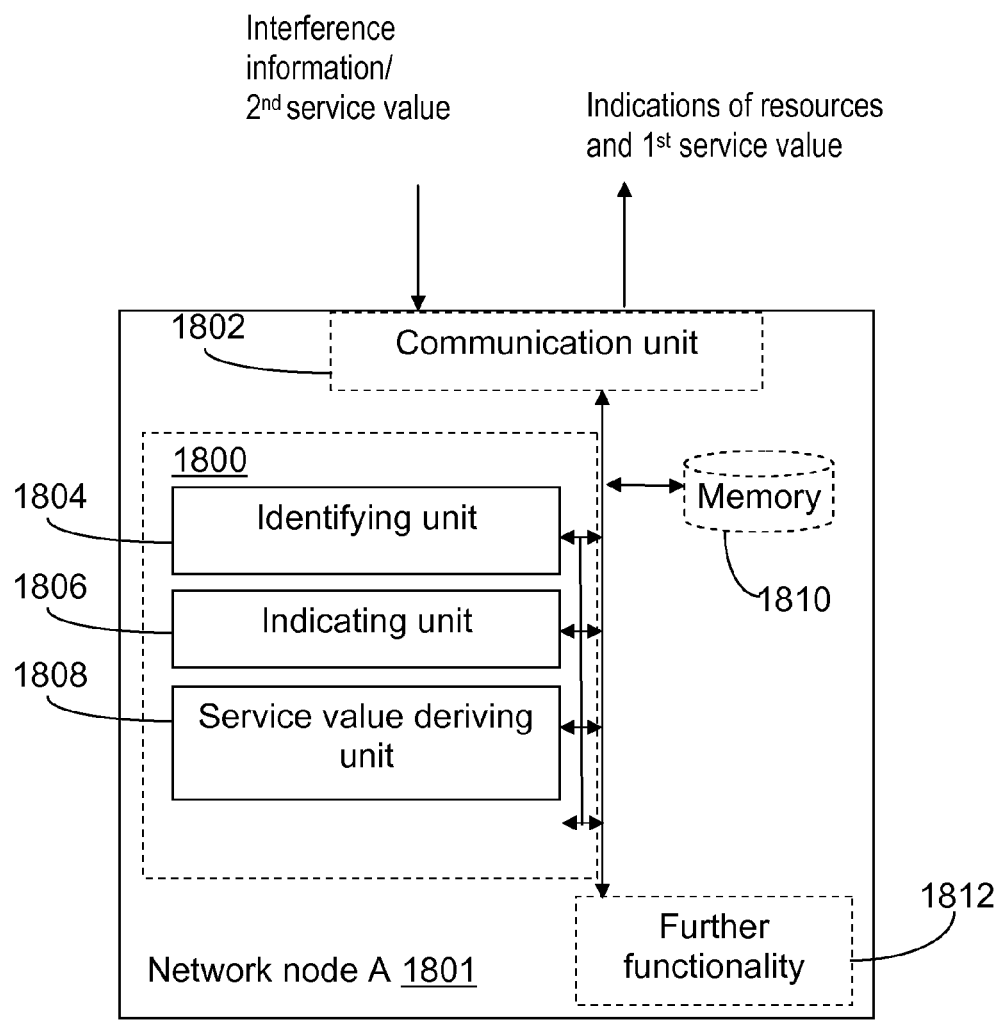
FIGS. 18-19 are block diagrams illustrating network nodes according to exemplifying embodiments.

Exemplifying Network Node A, FIG. 18

Below, an example network node A 1801, adapted to enable the performance of the above described procedure for supporting inter-cell coordination of scheduling of radio resources subjected to inter-cell interference in a cellular communication system will be described with reference to FIG. 18. The network node may be of a number of different types, as described above. The network node 1801 is further illustrated as to communicate with other entities via a communication unit 1802 which may be considered to comprise means for wireless and/or wired communication, e.g. antennas and transmitter and receiver equipment. For example, the network node A is assumed to be capable of, when appropriate, communicate e.g. via the X2 and S1 interfaces, or differently named interfaces having similar functions. The network node A 1801 may further comprise other functional units 1812, such as e.g. functional units providing regular base station/eNB functionality, and may further comprise one or more storage units 1810. The functional units adapted or configured to enable or execute the different actions described above are illustrated as an arrangement 1800, surrounded by a dashed line.

The network node A 1801 comprises an identifying unit 1804, which is adapted to identify one or more radio resources, subjected to interference from communication in a cell served by a neighbor network node B. The interference experienced in said resources may be assumed to exceed a predetermined threshold. The network node 1801 further comprises a service value deriving unit 1808, which is adapted to derive a first service value related to the service that could be provided in a cell served by the network node A by use of the identified one or more radio resources. The network node 1801 further comprises an indicating unit 1806, which is adapted to indicate the identified radio resource(s) to the neighbor network node B; and further adapted to indicate the first service value to the neighbor network node B. Thus, the network node is adapted to enable inter-cell service value-based scheduling of the one or more radio resources, prioritizing, also between cells, services having the highest value per uplink radio resource.

In order to avoid repetition, the different possible embodiments of the network node A corresponding to the features or actions described above in conjunction with the procedure in a network node A will not be further described here, than stating that the network node could be adapted to perform said actions and thus provide said features.

The network node A 1801 or the arrangement 1800 could be implemented e.g. by one or more of: a processor or a micro processor and adequate software stored in a memory, a Programmable Logic Device (PLD) or other electronic component(s) or processing circuit(s) configured to perform the actions mentioned above.

Figure 17:
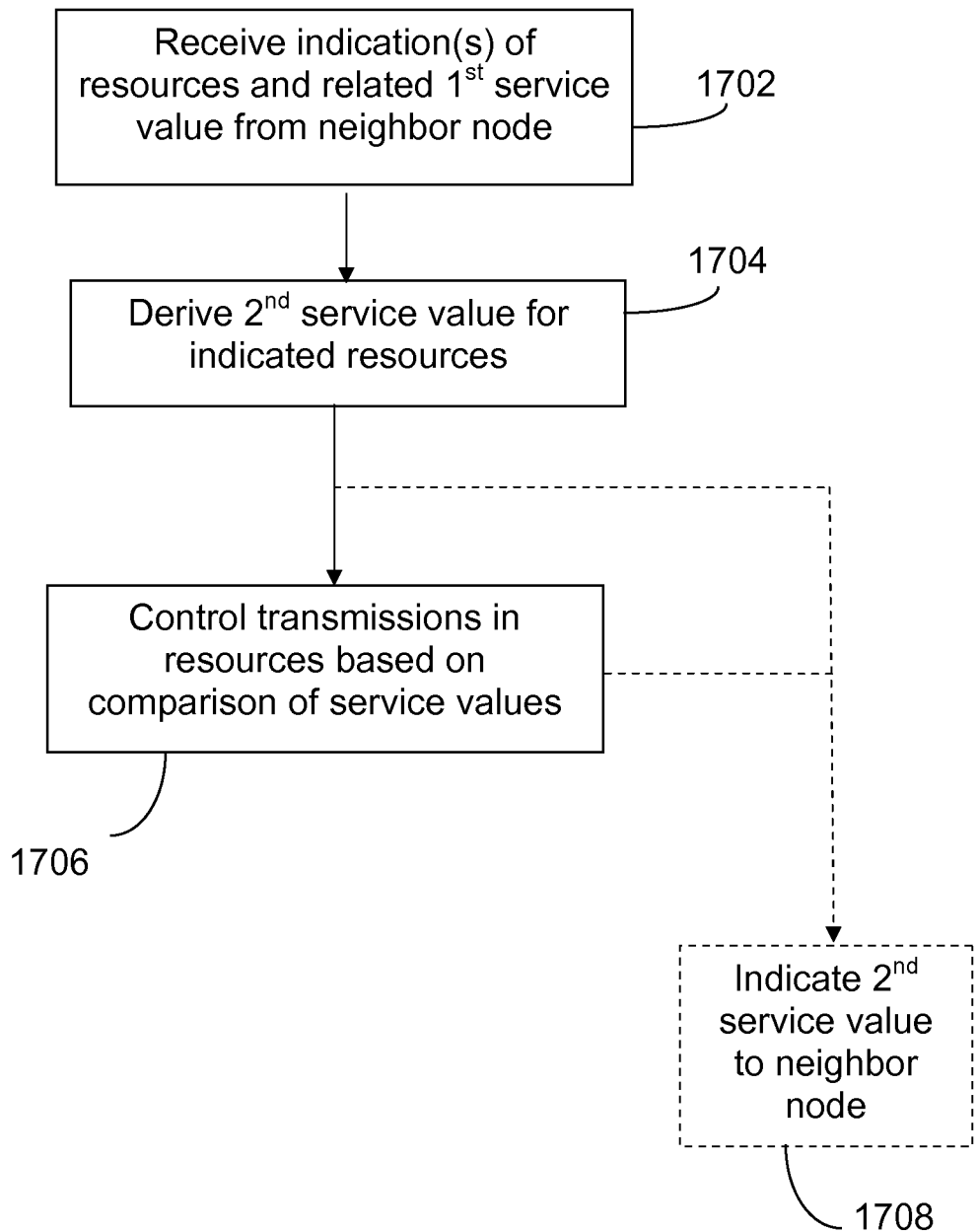
FIG. 17 is a flow diagram illustrating a procedure in a network node B (or a receiving or interfering network node) according to an exemplifying embodiment.

Exemplifying Procedure in a Network Node B, FIG. 17.

An exemplifying embodiment of the procedure for supporting inter-cell coordination of scheduling of radio resources subjected to inter-cell interference in a cellular communication system will be described below with reference to FIG. 17. The procedure is to be performed in a network node B in the cellular communication system. The network node B may also be denoted the "receiving network node", or "the interfering network node". The network node B may be an eNB in an LTE type cellular communication system, or e.g. a base station or an RNC in a WCDMA type system. As stated above, the letters "A" and "B" are used for reasons of identification only.

The procedure comprises receiving an indication of one or more radio resources from a neighbor network node A, in an action 1702, where the indicated resources are subjected to interference from a cell served by the network node B. Further, an indication from the neighbor network node A of a first service value related to the one or more radio resources is received. The indications may be conveyed jointly e.g. in the same message, or separately, e.g. in different messages or communications. A second service value relating to the service that could be provided in the cell served by the network node (B) by use of the one or more radio resources is derived in an action 1704.

The transmissions in the one or more radio resources are controlled in an action 1706 based on comparison of the service values. For example, it may determined how the one or more radio resources should be allocated to, e.g. divided between, the network node B and the neighbor network node A, based on comparison of the service values. The radio resources could be allocated e.g. only to network node B; only to network node A; partly to network node B and A; and/or partly or entirely to a third node, which could provide services of even higher service value per radio resource in a third neighbor cell, e.g. at a certain interference level. The control of transmissions could then be based on the determined allocation. For example, it may be concluded that a certain radio resource should not be allocated to/used by the network node B, and then the communication to and/or from at least one UE served by network node B should e.g. be cancelled in said radio resource. Alternatively, it may suffice that e.g. the transmission power of one or more UEs served by network node B is reduced in the radio resource in question. When no action needs to be performed by network node B, controlling implies e.g. maintaining current state of transmissions.

In order to select which UEs that should be subjected to limitation certain actions could be taken. A set of one or more UEs could be identified, of which UEs the communication causes the most interference to the neighbor network node A, of the UEs served by the network node B, in the concerned radio resources. The set of UEs could be identified e.g. by identifying which of the UEs served by the network node B that receive the strongest downlink signal from the neighbor network node A. Further, the UEs in the set could be ranked in terms of which UE that would be the best candidate for a limitation. The ranking could be based on the derivative of a service value curve, associated with service provided to the respective UEs, at the current interference level. Other values, similar or related to the derivative of the value curve, such as e.g. an anticipated change could also be used e.g. for ranking. When interference to the neighbor cell should be reduced in one or more radio resources, the UEs of which the communication should be subjected to limitations cold be selected in order according to rank, starting with the UE having the highest (or lowest) rank, i.e. in case of ranking according to service curve derivative, the UE having the lowest service value curve derivative.

The second service value could be indicated to the neighbor network node A in response to the received indication of the first service value, e.g. in an action 1708, which could be performed e.g. directly after the second service value is determined or after an analysis of the relation between the first and second service value. The indicating of the second service value to the neighbor network node could be performed e.g. as information to the neighbor network node A of which node (of the nodes A and B) that is associated with the highest service value per resource in the concerned radio resources. This action is illustrated in FIG. 17 using dashed lines to show that it is an optional action.

Figure 19:
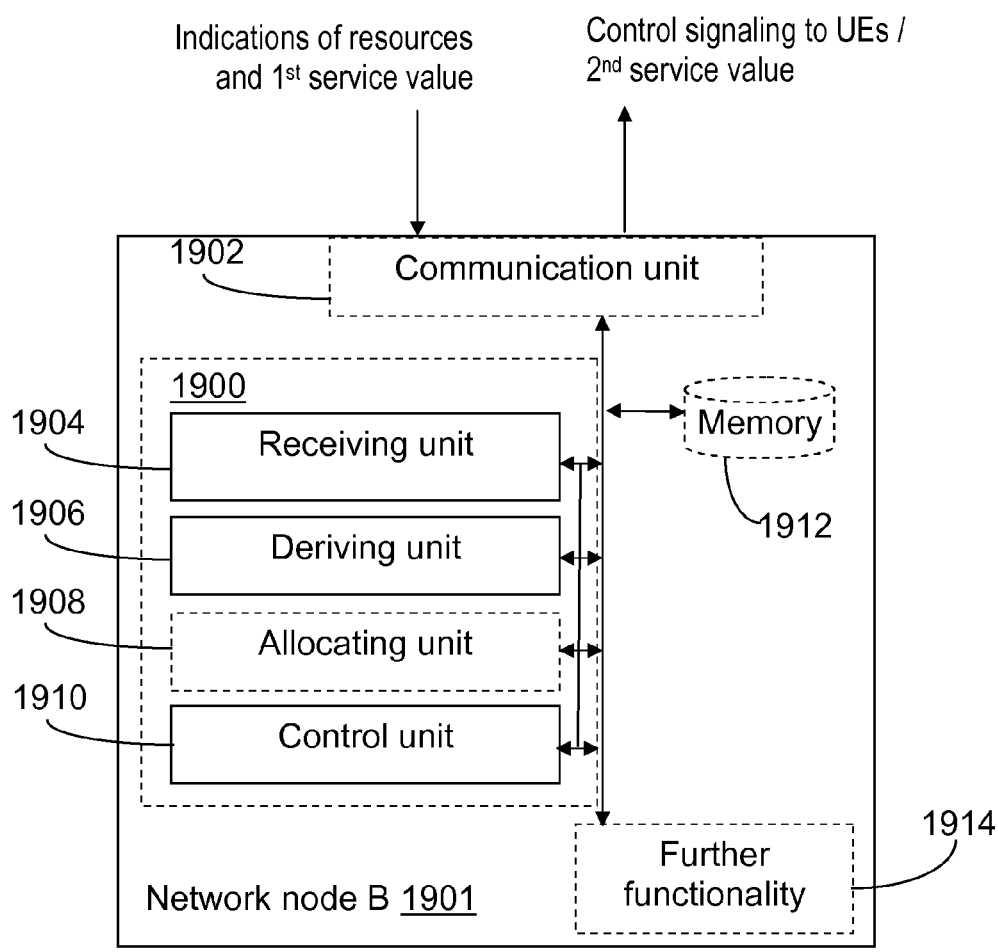

Exemplifying Network Node B, FIG. 19

Below, an example network node B 1901, adapted to enable the performance of the above described procedure for supporting inter-cell coordination of scheduling of radio resources subjected to inter-cell interference in a cellular communication system will be described with reference to FIG. 19. The network node may be of a number of different types, as described above. The network node 1901 is further illustrated as to communicate with other entities via a communication unit 1902 which may be considered to comprise means for wireless and/or wired communication, e.g. antennas and transmitter and receiver equipment. For example, the network node B is assumed to be capable of, when appropriate, communicate e.g. via the X2 and S1 interfaces, or differently named interfaces having similar functions. The network node B 1901 may further comprise other functional units 1914, such as e.g. functional units providing regular base station/eNB functionality, and may further comprise one or more storage units 1912. The functional units adapted or configured to enable or execute the different actions described above are illustrated as an arrangement 1900, surrounded by a dashed line.

The network node 1901 comprises a receiving unit 1904, adapted to receive, e.g. derive from a received data stream, an indication from neighbor network node A of one or more radio resources, which resources are subjected to interference from a cell served by network node B; and further adapted to receive an indication from the neighbor network node A of a potential first service value related to the one or more uplink radio resources. The network node B 1901 further comprises a deriving unit 1906, adapted to derive a second service value related to service that could be provided in the cell served by the network node B by use of the one or more radio resources. Further, the network node B 1901 comprises a control unit 1910, which is adapted to control transmissions in the one or more radio resources based on comparison of the service values, e.g. by limiting transmissions to or from certain UEs, as described above. Thus, the network node B 1901 is adapted to enable inter-cell service value-based scheduling of the one or more radio resources, prioritizing, also between cells, services having the highest value per uplink radio resource.

In order to avoid repetition, the different possible embodiments of the network node B corresponding to the features or actions described above in conjunction with the procedure in a network node A will not be further described here, than stating that the network node could be adapted to perform said actions and thus provide said features.

The network node B 1901 or the arrangement 1900 could be implemented e.g. by one or more of: a processor or a micro processor and adequate software stored in a memory, a Programmable Logic Device (PLD) or other electronic component(s) or processing circuit(s) configured to perform the actions mentioned above.

Figure 20:
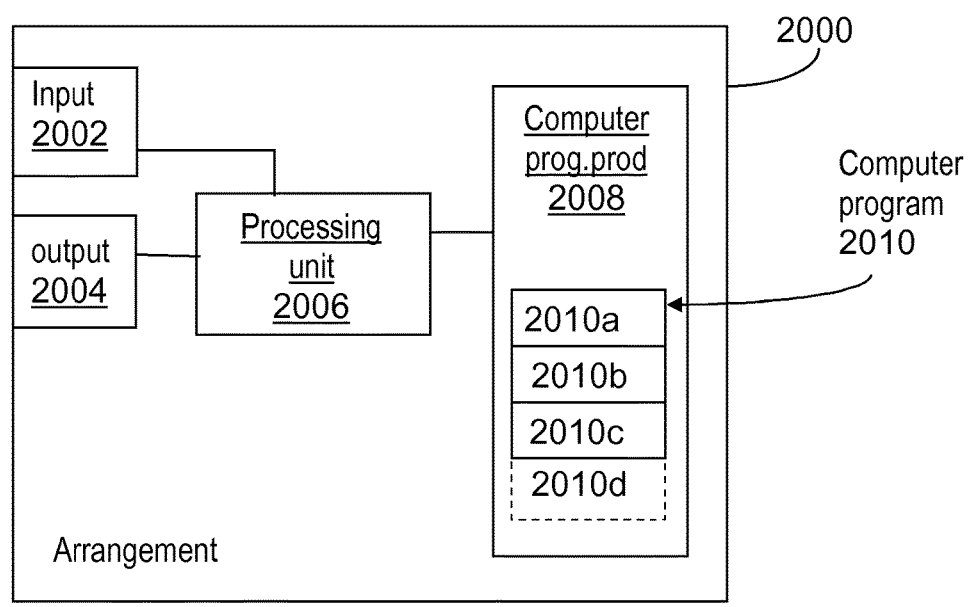
FIG. 20 is a block diagram illustrating an arrangement in a network node according to an exemplifying embodiment.

Exemplifying Embodiment, FIG. 20

FIG. 20 schematically shows an embodiment of an arrangement 2000 in a network node, which also can be an alternative way of disclosing e.g. an embodiment of the arrangement 1800 in a network node A illustrated in FIG. 18. Comprised in the arrangement 2000 are here a processing unit 2006, e.g. with a DSP (Digital Signal Processor). The processing unit 2006 may be a single unit or a plurality of units to perform different actions of procedures described herein. The arrangement 2000 may also comprise an input unit 2002 for receiving signals from other entities, and an output unit 2004 for providing signal(s) to other entities. The input unit 2002 and the output unit 2004 may be arranged as an integrated entity.

Figure 9:
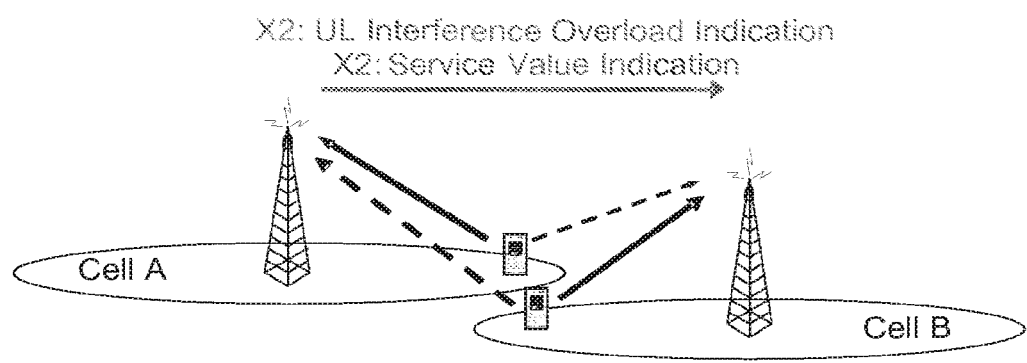
FIG. 9 shows an exemplifying scenario where a service value indication is transmitted according to an exemplifying embodiment.

Furthermore, the arrangement 2000 comprises at least one computer program product 2008 in the form of a non-volatile memory, e.g. an EEPROM (Electrically Erasable Programmable Read-Only Memory), a flash memory and a hard drive. The computer program product 2008 comprises a computer program 2010, which comprises code means, which when executed in the processing unit 2006 in the arrangement 2000 causes the arrangement and/or the network node to perform the actions e.g. of the procedure described earlier in conjunction with FIG. 9.

The computer program 2010 may be configured as a computer program code structured in computer program modules. Hence, in an exemplifying embodiment, the code means in the computer program 2010 of the arrangement 2000 comprises an identifying module 2010a for identifying one or more radio resources, subjected to interference from communication in a neighbor cell. The computer program further comprises a service value deriving module 2010b for deriving a first service value related to the service that could be provided by use of the identified one or more radio resources. The computer program 2010 further comprises an indicating module 2010c for indicating the identified radio resource(s) and the first service value to the neighbor network node B. The computer program 2010 could further comprise other modules 2010d for providing other desired functionality.

The modules 2010a-c could essentially perform the actions of the flow illustrated in FIG. 16, to emulate the arrangement in a network node illustrated in FIG. 18. In other words, when the different modules 2010a-c are executed in the processing unit 2006, they may correspond to the units 1804-1808 of FIG. 18.

Although the code means in the embodiment disclosed above in conjunction with FIG. 20 are implemented as computer program modules which when executed in the processing unit causes the arrangement and/or network node to perform the actions described above in the conjunction with figures mentioned above, at least one of the code means may in alternative embodiments be implemented at least partly as hardware circuits.

The processor may be a single CPU (Central processing unit), but could also comprise two or more processing units. For example, the processor may include general purpose microprocessors; instruction set processors and/or related chips sets and/or special purpose microprocessors such as ASICs (Application Specific Integrated Circuit). The processor may also comprise board memory for caching purposes. The computer program may be carried by a computer program product connected to the processor. The computer program product may comprise a computer readable medium on which the computer program is stored. For example, the computer program product may be a flash memory, a RAM (Random-access memory) ROM (Read-Only Memory) or an EEPROM, and the computer program modules described above could in alternative embodiments be distributed on different computer program products in the form of memories within the network node.

In a similar manner, an exemplifying embodiment comprising computer program modules could be described for the arrangement in a network node B illustrated in FIG. 19.

It is to be understood that the choice of interacting units or modules, as well as the naming of the units within this disclosure are only for exemplifying purpose, and nodes suitable to execute any of the methods described above may be configured in a plurality of alternative ways in order to be able to execute the suggested procedure actions.

It should also be noted that the units or modules described in this disclosure are to be regarded as logical entities and not with necessity as separate physical entities.

The invention claimed is:

1. A method for supporting inter-cell coordination of scheduling of radio resources subjected to inter-cell interference in a cellular communication system, the method comprising:

identifying one or more radio resources subjected to inter-cell interference between a first cell served by a first network node and a second cell served by a second network node;

deriving a respective service value, associated with the first and second network node and related to service that could be provided in the respective first and second cell by use of the one or more radio resources; and controlling transmissions in the one or more radio resources based on comparison of the service values, to provide inter-cell service value-based scheduling of the one or more radio resources, prioritizing services having the highest value per radio resource, wherein controlling transmissions comprises comparing the service value that is associated with the first network node to the service value that is associated with the second network node and controlling transmissions of the one of the first and second network nodes having the lower respective service value based on the comparison.

2. The method according to claim 1, where the deriving of at least one of the service values comprises one or more of:

determining a current interference level in the one or more radio resources in a location in a cell served by the network node in question;

comparing the current interference level to a lowest interference level, measured over a period of time;

determining a change of a performance related characteristic of the one or more radio resources, based on the current interference level and the lowest interference level;

deriving a service value change based on the current interference level and lowest interference level; and deriving a service value change as a function of the performance related characteristic of the one or more radio resources.

3. The method according to claim 1, where the deriving of the respective service value is performed in different network nodes in the cellular communication system, wherein each of the network nodes is one of a radio base station and a control node.

4. The method according to claim 3, wherein at least one of the derived service values is signaled to another network node in the cellular communication system, in which the other service value is available.

5. The method according to claim 4, wherein the derived service value is signaled over at least one of:

an interface between radio base stations;
an interface between a radio base station and a control node; and
an interface between control nodes.

6. An arrangement in a cellular communication system, for supporting inter-cell coordination of scheduling of radio resources subjected to inter cell interference, the arrangement comprising:

an interference identifying unit, adapted to identify one or more radio resources subjected to inter-cell interference between a first cell served by a first network node and a second cell served by a second network node;

a service value deriving arrangement, adapted to derive a first service value associated with the first network node, related to service that could be provided in the first cell by use of the one or more radio resources; and further adapted to derive a second service value associated with the second network node, related to service that could be provided in the second cell by use of the one or more radio resources; and a control unit, adapted to control transmissions in the one or more radio resources based on comparison of the service values to provide inter-cell service value-based scheduling of the one or more radio resources, prioritizing services having the highest value per radio resource, wherein the control unit is adapted to control transmissions by comparing the first service value that is associated with the first network node to the second service value that is associated with the second network node and controlling transmissions of the one of the first and second network nodes having the lower respective service value based on the comparison.

7. The arrangement according to claim 6, further adapted to perform one or more of:

determining a current interference level in the one or more radio resources;

comparing the current interference level to a lowest interference level measured over a period of time;

determining an increase of a performance related characteristic of the one or more radio resources, based on a/the current interference level and a/the lowest interference level;

deriving a service value increase based on a/the current interference level and a/the lowest interference level; and deriving a service value increase as a function of a/the performance related characteristic of the one or more radio resources, in order to derive at least one of the service values.

8. The arrangement according to claim 6, comprising two network nodes, each being one of a radio base station and a control node, each being adapted to derive a respective one of the service values.

9. The arrangement according to claim 8, wherein at least a first one of the network nodes is adapted to signal the derived service value to another node in the arrangement, in which the other service value is available.

10. The arrangement according to claim 9, wherein the at least first one of the network nodes is adapted to signal the derived service value over at least one of:

an interface between radio base stations;
an interface between a radio base station and a control node; and
an interface between control nodes.

11. A method in a network node in a cellular communication system for supporting inter-cell coordination of scheduling of radio resources subjected to inter cell interference, the method comprising:

identifying one or more radio resources, subjected to interference from communication in a neighbor cell served by a neighbor network node, said interference exceeding a predefined threshold;

indicating the identified radio resource(s) to the neighbor network node;

deriving a first service value, related to service that could be provided in a cell served by the network node by use of the identified one or more radio resources; and indicating the first service value to the neighbor network node to facilitate inter-cell service value-based scheduling of the one or more radio resources, prioritizing services having the highest value per radio resource, wherein the first service value is derived based on a predetermined relationship between a value of a first type of service and a performance value, and wherein the predetermined relationship between the value of the first type of service and the performance value is different from a predetermined relationship between a value of a second type of service and the performance value.

12. The method according to claim 11; wherein the deriving of the first service value comprises one or more of:

determining a current interference level in the one or more radio resources;
comparing the current interference level to a lowest interference level measured over a period of time;
determining an increase of a performance related characteristic of the one or more radio resources, based on the current interference level and the lowest interference level;
deriving a service value increase based on the current interference level and the lowest interference level; and
deriving a service value increase as a function of the performance related characteristic of the one or more radio resources.

13. The method according to claim 11, wherein the first service value is indicated by one or more of:
a service value increase;
an explicit service value;
an indicator of a service type;
a potential increase of a performance related characteristic, and an indicator of a service type;
a current service value and an indicator of a relation between a potential service value and the current service value;
a quality of service indicator and a current service value;
an indicator related to the current service value of a currently provided service; and
an indicator related to a potential service value of a service which is about to be provided.

14. The method according to claim 11, wherein the first service value is indicated to the neighbor network node by an indication comprising at least one of:
one service value indicator per uplink radio resource;
one service value indicator representing all of the uplink radio resources; and
one service value indicator representing a subset of the uplink radio resources.

15. The method according to claim 11, wherein, when the first service value should represent more than one UE, said first service value is derived as one or more of:
an average over all services provided to the UEs in question;
a percentile over all services provided to the UEs in question;
an indicator expressing a summary of service values in the cell served by the network node; and
a service value indication for each of the one or more resources subjected interference.

16. The method according to claim 11, wherein the predetermined relationship between the value of the first type of service and the performance value is a non-linear function.

17. The method according to claim 11, wherein the first service value is scaled according to a spectral efficiency of the identified radio resource(s).

18. A network node in a cellular communication system, for supporting scheduling of radio resources subjected to inter cell interference, the network node comprising:
an identifying unit, adapted to identify one or more radio resources, subjected to interference from communication in a cell served by a neighbor network node, said interference exceeding a predefined threshold;
an indicating unit, adapted to indicate the identified radio resource(s) To the neighbor network node; and
a service value deriving unit adapted to derive a first service value related to the service that could be provided in a cell served by the network node by use of the identified one or more radio resources,
wherein the indicating unit is further adapted to indicate the first service value to the neighbor network node to facilitate service value-based scheduling of the one or more radio resources, prioritizing services having the highest value per uplink radio resource,
wherein the service value deriving unit is adapted to derive the first service value based on a predetermined relationship between a first type of service and a performance value, and
wherein the predetermined relationship between the first type of service and the performance value is different from a predetermined relationship between a second type of service and the performance value.

19. The network node according to claim 18, further adapted to perform one or more of:
determining a current interference level in the one or more radio resources;
comparing the current interference level to a lowest interference level measured over a period of time;
determining an increase of a performance related characteristic of the one or more radio resources, based on a/the current interference level and a/the lowest interference level;
deriving a service value increase based on a/the current interference level and a/the lowest interference level; and
deriving a service value increase as a function of a/the performance related characteristic of the one or more radio resources,
in order to derive the first service value.

20. The network node according to claim 18, further adapted to express the first service value as one or more of:
a service value increase;
an explicit service value;
an indicator of a service type;
a potential increase of a performance related characteristic, and an indicator of a service type;
a current service value and an indicator of a relation between a potential service value and the current service value;
a quality of service indicator and a current service value;
an indicator related to the current service value of a currently provided service; and
an indicator related to a potential service value of a service which is about to be provided,
when indicating the first service value to the neighbor network node.

21. The network node according to claim 18, further adapted to indicate the first service value by an indication comprising at least one of;
one service value indicator per uplink radio resource;
one service value indicator representing all of the uplink radio resources; and
one service value indicator representing a subset of the uplink radio resources.

22. The network node according to claim 18, further adapted to derive the first service value, when the first service value should represent more than one UE, as one or more of:
an average over all services provided to the UEs in question;
a percentile over all services provided to the UEs in question;
an indicator expressing a summary of service values in the cell served by the network node; and
a service value indication for each of the one or more resources subjected interference.

23. A method in a network node in a cellular communication system for supporting scheduling of radio resources subjected to inter cell interference, the method comprising:
receiving an indication from a neighbor network node of one or more radio resources, which resources are subjected to interference from a cell served by the network node;
receiving an indication from the neighbor network node of a potential first service value related to the one or more radio resources;
deriving a second service value relating to the service that could be provided in the cell served by the network node by use of the one or more radio resources; and
controlling transmissions in the one or more radio resources used on comparison of the service values to provide service value-based scheduling of the one or more radio resources, prioritizing services having the highest value per radio resource,
wherein controlling transmissions in the one or more radio resources comprises, based on the comparison of the service values indicating that the interference to a neighbor cell served by the neighbor network node is to be reduced in at least one of the one or more resources subjected to interference:
identifying, a set of one or more UEs served by the network node, of which the communication causes the most interference to the neighbor network node, of the UEs served by the network node, in the one or more radio resources; and
limiting a communication of at least one of the UEs in the set according to rank, starting with the UE having the lowest service value curve derivative among service value curves of the UEs in the set.

24. The method according to claim 23, wherein the identifying of the set involves identifying which of the UEs served by the network node that receive the strongest downlink signal from the neighbor network node.

25. The method according to claim 23,
wherein limiting the communication comprises limiting the transmissions related to at least one UE in said set of UEs, in the one or more radio resources, by one or more of:
reducing a transmission bandwidth of the UE;
reducing a ratio of radio resources, allocated to the UE, in time;
reducing a ratio of radio resources, allocated to the UE, in frequency; and
reducing a transmission power of the UE, by adjusting UL power control parameters.

26. The method according to claim 23, further comprising:
at least when an interference level should be maintained in at least one of the one or more radio resources subjected to interference:
indicating the second service value to the neighbor network node in response to the received indication of the first service value.

27. A network node in a cellular communication system, for supporting scheduling of radio resources subjected to inter cell interference, the network node comprising:
a receiving unit, adapted to receive an indication from a neighbor network node of one or more radio resources, which resources are subjected to interference from a cell served by network node; and further adapted to receive an indication from the neighbor network node of a potential first service value related to the one or more radio resources;
a deriving unit, adapted to derive a second service value related to service that could be provided in the cell served by the network node by use of the one or more radio resources; and
a control unit, adapted to control transmissions in the one or more radio resources based on comparison of the service values, to provide inter cell service value-based scheduling of the one or more radio resources, prioritizing services having the highest value per radio resource,
wherein the control unit is adapted to control transmissions in the one or more radio resources by:
identifying a set of one or more U a served by the network node, of which UEs the communication causes the most interference to the neighbor network node, of the UEs served by the network node, in the one or more radio resources;
ranking the UEs in the set according to respective derivatives of service value curves associated with service provided to the respective at a current interference level; and
limiting a communication of at leant one of the UEs in the set according to rank, starting with the UP having the lowest service value curve derivative among service value curves of the UEs in the set.

28. The network node according to claim 27, further adapted to identify the set by identifying the UEs, served by the network node, that receive the strongest downlink signal from the neighbor network node.

29. The network node according to claim 27, wherein the control unit is adapted to limit transmissions related to at least one UE in said set of UEs, in the one or more radio resources, by one or more of:
reduction of a transmission bandwidth of the UE;
reduction of a ratio of radio resources, allocated to the UE, in time;
reduction of a ratio of radio resources, allocated to the UE, in frequency; and
reduction of a transmission power of the UE, by adjusting UL power control parameters.

30. The network node according to claim 27, further adapted to indicate the second service value to the neighbor network node in response to the received indication of the first service value.

* * * * *